(12) United States Patent
Tagawa et al.

(10) Patent No.: US 8,818,604 B2
(45) Date of Patent: Aug. 26, 2014

(54) DRIVE CONTROL APPARATUS OF HYBRID VEHICLE

(75) Inventors: Masaaki Tagawa, Hamamatsu (JP); Yoshiki Ito, Hamamatsu (JP); Masakazu Saito, Hamamatsu (JP); Hitoshi Ohkuma, Hamamatsu (JP); Yukihiro Hosoe, Hamamatsu (JP)

(73) Assignee: Suzuki Motor Corporation, Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/985,919

(22) PCT Filed: Feb. 21, 2011

(86) PCT No.: PCT/JP2011/053691
§ 371 (c)(1),
(2), (4) Date: Nov. 22, 2013

(87) PCT Pub. No.: WO2012/114431
PCT Pub. Date: Aug. 30, 2012

(65) Prior Publication Data
US 2014/0067180 A1    Mar. 6, 2014

(51) Int. Cl.
| | | |
|---|---|---|
| *B60L 9/00* | (2006.01) | |
| *B60W 10/08* | (2006.01) | |
| *B60W 10/06* | (2006.01) | |
| *B60W 10/26* | (2006.01) | |
| *B60K 6/445* | (2007.10) | |
| *B60K 6/365* | (2007.10) | |
| *B60W 20/00* | (2006.01) | |

(52) U.S. Cl.
CPC ........... *B60W 20/10* (2013.01); *B60W 2520/10* (2013.01); *B60W 10/08* (2013.01); *Y02T 10/6239* (2013.01); *B60W 10/06* (2013.01); *Y10S 903/93* (2013.01); *B60W 10/26* (2013.01); *B60K 6/445* (2013.01); *B60K 6/365* (2013.01); *B60W 2540/10* (2013.01); *B60W 2510/244* (2013.01); *Y02T 10/6286* (2013.01)
USPC ............................................ 701/22; 903/930

(58) Field of Classification Search
None
See application file for complete search history.

(56) References Cited

U.S. PATENT DOCUMENTS

2013/0184913 A1* 7/2013 Sujan et al. .................... 701/22

(Continued)

FOREIGN PATENT DOCUMENTS

JP     2006-232258 A     9/2006

(Continued)

OTHER PUBLICATIONS

Form PCT/ISA/210 International Search Report issued in International Application No. PCT/JP2011/053691 with English translation, date of mailing May 24, 2011 (5 pages).

*Primary Examiner* — Thomas Tarcza
*Assistant Examiner* — Adam Alharbi
(74) *Attorney, Agent, or Firm* — Flynn, Thiel, Boutell & Tanis, P.C.

(57) ABSTRACT

In a drive control apparatus (1) of a hybrid vehicle, a change rate restriction value of a target engine rotational speed which is set on the basis of a vehicle speed is preset, a restriction value of the target engine rotational speed is calculated from the change rate restriction value and a previous target engine rotational speed, a target engine operation point to decide the target engine rotational speed and a target engine torque is set on the basis of the restriction value of the target engine rotational speed and the provisional target engine rotational speed, a target electric power is calculated from a difference between a target engine power which is calculated from the target engine operation point and a target drive power, and torque instruction values of a plurality of motor generators (4, 5) are calculated by using a torque balance equation including a target engine torque which is obtained from the target engine operation point and an electric power balance equation including the target electric power.
Thus, even in a transient state where the operation point of the internal combustion engine (2) is changed, since the target operation point line is traced, the fuel consumption can be improved.

1 Claim, 12 Drawing Sheets

(56) References Cited

U.S. PATENT DOCUMENTS

| | | |
|---|---|---|
| 2013/0184914 A1* | 7/2013 | Sujan et al. .................... 701/22 |
| 2014/0058604 A1* | 2/2014 | Ito et al. ........................ 701/22 |
| 2014/0074334 A1* | 3/2014 | Tagawa et al. ................. 701/22 |

FOREIGN PATENT DOCUMENTS

| | | |
|---|---|---|
| JP | 2004-262275 A | 9/2004 |
| JP | 2008-12992 A | 1/2008 |
| JP | 2010-208576 A | 9/2010 |

\* cited by examiner

ARITHMETIC OPERATION OF TARGET ENGINE OPERATION POINT

ARITHMETIC OPERATION OF MOTOR TORQUE INSTRUCTION VALUE

CALCULATION OF MOTOR TORQUE INSTRUCTION VALUE

FIG. 8  TARGET ENGINE OPERATION POINT IN TRANSIENT STATE
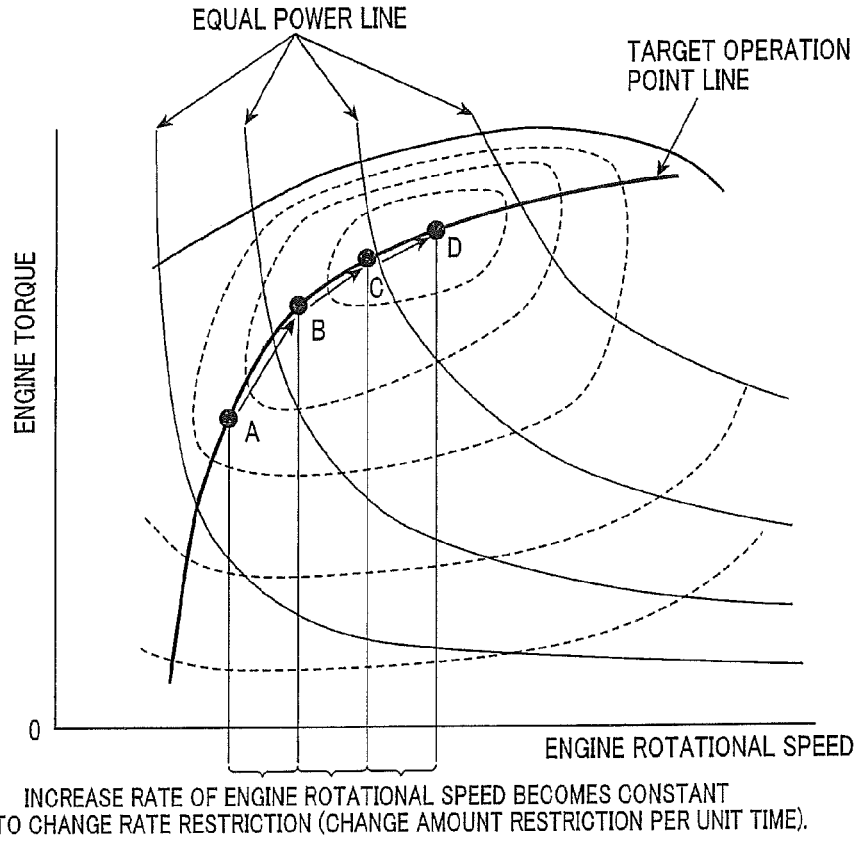
INCREASE RATE OF ENGINE ROTATIONAL SPEED BECOMES CONSTANT
DUE TO CHANGE RATE RESTRICTION (CHANGE AMOUNT RESTRICTION PER UNIT TIME).
FIG. 9  TARGET DRIVE FORCE RETRIEVAL MAP
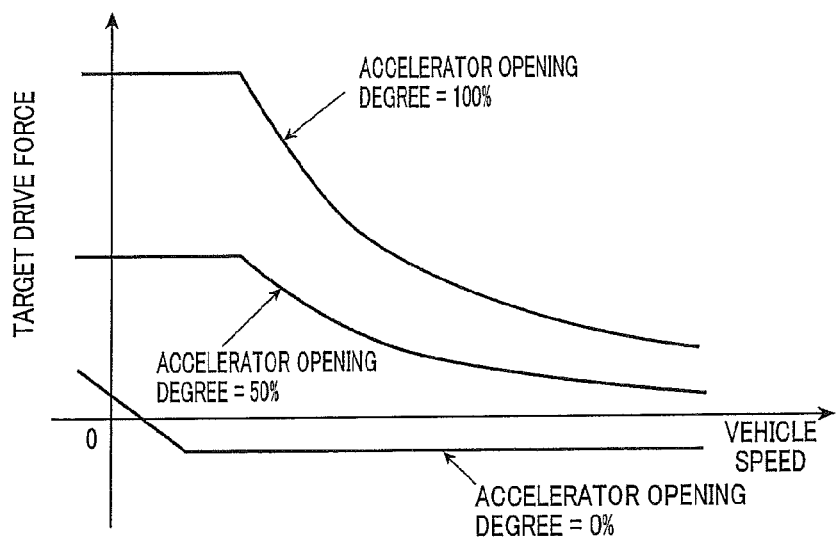

TARGET CHARGE/DISCHARGE POWER RETRIEVAL TABLE

TARGET ENGINE OPERATION POINT RETRIEVAL MAP

COLLINEAR DIAGRAM IN THE CASE WHERE VEHICLE SPEED
IS CHANGED AT THE SAME ENGINE OPERATION POINT

EACH EFFICIENCY ON EQUAL POWER LINE

COLLINEAR DIAGRAM OF EACH POINT (D, E, F) ON EQUAL POWER LINE

BEST LINE OF ENGINE EFFICIENCY AND BEST LINE OF WHOLE EFFICIENCY

COLLINEAR DIAGRAM OF LOW GEAR RATIO STATE

COLLINEAR DIAGRAM OF INTERMEDIATE GEAR RATIO STATE

COLLINEAR DIAGRAM OF HIGH GEAR RATIO STATE

COLLINEAR DIAGRAM OF STATE WHERE MOTIVE POWER CIRCULATION HAS OCCURRED

DRIVE CONTROL APPARATUS OF HYBRID VEHICLE

TECHNICAL FIELD

The invention relates to a drive control apparatus of a hybrid vehicle and, more particularly, to a drive control apparatus of a hybrid vehicle which has a plurality of motive power sources and synthesizes motive powers by a power transmission mechanism and inputs/outputs to/from a drive axis, wherein an operation point of an internal combustion engine (engine operation point) and a motor torque for performing power assistance by an electric power of a battery are controlled.

BACKGROUND ART

As a vehicle, there is a hybrid vehicle for driving and controlling a vehicle by using outputs from an internal combustion engine and a plurality of motor generators (electric motors) as drive sources.

As such a hybrid vehicle, there are a series system (the internal combustion engine is used only to rotate the power generator and the whole driving is performed by the motor generators) and a parallel system (the internal combustion engine and the motor generator are arranged in parallel and their motive powers are used for driving).

In the hybrid vehicle, as another system of the series system and the parallel system, there is such a system that as a power transmission mechanism of a triaxial type, a motive power of an internal combustion engine is divided to a power generator and a drive axis by using one planetary gear mechanism (differential gear mechanism having three rotational elements) and two motor generators (first motor generator: MG1, second motor generator: MG2) as a motor generator and the motor generator provided for a drive axis is driven by using an electric power generated by the power generator, thereby torque converting the motive power of the internal combustion engine (the Official Gazette of Japanese Patent No. 3050125, the Official Gazette of Japanese Patent No. 3050138, the Official Gazette of Japanese Patent No. 3050141, the Official Gazette of Japanese Patent No. 3097572).

Thus, in the hybrid vehicle, the operation point of the internal combustion engine (engine operation point) can be set to an arbitrary point where a stop is included and fuel consumption is improved.

CITATION LIST

Patent Literature

PTL1: The Official Gazette of JP-A-2008-12992

In a drive control apparatus of a hybrid vehicle according to Patent Literature 1, in the case of a same engine power, the higher a vehicle speed is, the higher an engine rotational speed at a target engine operation point is.

SUMMARY OF INVENTION

Technical Problem

In the related art, in a hybrid vehicle, although not particularly similar to the series system, since a motor generator having a relatively large torque is necessary in order to obtain a sufficient torque of a drive axis and a transmission/reception amount of an electric power between the power generator and the motor generator increases in a LOW gear ratio range, an electrical loss increases and there is still a room for improvement.

As a method of solving such a point, as a power transmission mechanism of a quadruple type, there is such a structure that an output axis of an internal combustion engine, a first motor generator, a second motor generator, and a drive axis connected to a drive wheel are connected to each rotational element of the power transmission mechanism (differential gear mechanism) having four rotational elements and a motive power of the internal combustion engine and motive powers of the first motor generator and the second motor generator are synthesized and output to the drive axis. The output axis of the internal combustion engine and the drive axis are arranged to the inside rotational elements on a collinear diagram and the first motor generator on the internal combustion engine side and the second motor generator on the drive axis side are arranged to the outside rotational elements on a collinear diagram, thereby decreasing a ratio of the motive powers which are transmitted by the first and second motor generators in the motive power which is transmitted from the internal combustion engine to the drive axis, miniaturizing the first and second motor generators, and improving a transmission efficiency as a driving apparatus (the Official Gazette of JP-A-2004-15982, the Official Gazette of JP-A-2002-281607).

As a power transmission mechanism of the quadruple type, there is such a structure that a method similar to that of the foregoing structure is used and, further, the fifth rotational element is added and a brake for stopping a rotation of the fifth rotational element is provided (the Official Gazette of Japanese Patent No. 3578451).

In the foregoing power transmission mechanism of the triaxial type disclosed in the Official Gazette of Japanese Patent No. 3050125, by adding a drive force which is required for the vehicle and the electric power which is required to charge a battery, a power to be generated by the internal combustion engine is calculated, and a point where an efficiency is as high as possible is calculated from a combination of a torque serving as such a power and an engine rotational speed and is used as a target engine operation point. The first motor generator is driven and controlled so that the engine operation point becomes the target engine operation point, thereby controlling the engine rotational speed.

However, in the case of the power transmission mechanism of the triaxial type, since the torque of the second motor generator does not exert an influence on a torque balance, if a torque which is output to a drive axis by the internal combustion engine and the first motor generator is calculated from the torque of the first motor generator obtained by feedback controlling the torque of the first motor generator so that the engine rotational speed approaches a target value and the torque of the second motor generator is controlled so as to be equal to a value obtained by subtracting a value of the calculated torque from a target drive force, even when the engine torque fluctuates, the target drive force can be output from the drive axis.

However, in the case of the power transmission mechanism of the quadruple type, since the drive axis and the second motor generator have different axes and the torque of the second motor generator also exerts an influence on the torque balance and exerts an influence on the control of the engine rotational speed, the control method of the power transmission mechanism of the triaxial type mentioned above cannot be used.

In the case of the foregoing power transmission mechanism of the quadruple type disclosed in the Official Gazette of JP-A-2004-15982, the torques of the first motor generator and the second motor generator in the case where the vehicle runs in a state where there is no charge/discharge to/from a battery are calculated from a torque balance equation, the rotational speed is feedback controlled, and the engine rotational speed and the drive force are controlled. However, nothing is mentioned about the control in case where there is a charge/discharge to/from the battery, for example, in case where the power assistance by the electric power of the battery is performed.

Further, in a hybrid vehicle which synthesizes an output of an internal combustion engine and motive powers of a first motor generator and a second motor generator and drives a drive axis connected to a drive wheel, there is considered a method whereby: a value of a drive force obtained by adding a power corresponding to power assistance by an electric power is preset as a maximum value of the target drive force; a target drive power is obtained from the target drive force in which an accelerator opening degree and a vehicle speed are used as parameters and from the vehicle speed; a target charge/discharge power is obtained on the basis of a state of charge (SOC) of a battery; a value added to the target drive power and a maximum output which can be output by the engine are compared and a value of the smaller one of them is obtained as a target engine power; a target engine operation point is obtained from the target engine power; a target electric power serving as a target value of an input/output electric power to/from the battery is obtained from a difference between the target drive power and the target engine power; and control instruction values (motor torque instruction values) of the first motor generator and the second motor generator are arithmetically operated from a torque balance equation including a target engine torque and an electric power balance equation including the target electric power.

However, although the power assistance by the electric power of the battery can be performed by such a method even in the quadruple type, in a transient state where the engine operation point is being changed, it is necessary to avoid annoyance due to a frequent large change in engine rotational speed. In the case of suppressing a change in engine rotational speed in order to avoid such annoyance, the output of the internal combustion engine becomes a necessary output or less. Therefore, in this state, since the actual drive power is smaller than the target drive power which is required by the driver, there is still a room for improvement.

It is, therefore, an object of the invention to provide a drive control apparatus of a hybrid vehicle for satisfying both of a point that an internal combustion engine is protected by restricting an engine rotational speed and a point that a drive force which is required by the driver is satisfied by power assistance using an electric power of a battery.

Solution to Problem

According to the invention, there is provided a drive control apparatus of a hybrid vehicle for driving and controlling a vehicle by using outputs from an internal combustion engine and a plurality of motor generators, comprising: accelerator opening degree detecting means for detecting an accelerator opening degree; vehicle speed detecting means for detecting a vehicle speed; battery charge state detecting means for detecting a charge state of a battery; and control means having target drive power setting means for setting a target drive power on the basis of the accelerator opening degree detected by the accelerator opening degree detecting means and the vehicle speed detected by the vehicle speed detecting means, target charge/discharge power setting means for setting a target charge/discharge power on the basis of at least the charge state of the battery detected by the battery charge state detecting means, and motor torque instruction value operating means for setting a torque instruction value of each of the plurality of motor generators, wherein the control means has provisional target engine power calculating means for calculating a provisional target engine power from the target drive power set by the target drive power setting means and the target charge/discharge power set by the target charge/discharge power setting means, provisional target engine operation point setting means for setting a provisional target engine operation point to decide a provisional target engine rotational speed and a provisional target engine torque from the provisional target engine power calculated by the provisional target engine power calculating means and a retrieval map of a whole system efficiency, target engine operation point setting means for presetting a change rate restriction value of the target engine rotational speed which is set on the basis of the vehicle speed detected by the vehicle speed detecting means, calculating a restriction value of the target engine rotational speed from the change rate restriction value and a previous target engine rotational speed, and setting a target engine operation point to decide the target engine rotational speed and a target engine torque on the basis of the restriction value of the target engine rotational speed and the provisional target engine rotational speed, and target electric power calculating means for calculating a target electric power from a difference between the target engine power which is calculated from the target engine operation point set by the target engine operation point setting means and the target drive power set by the target drive power setting means, and wherein the motor torque instruction value operating means calculates the torque instruction value of each of the plurality of motor generators by using a torque balance equation including the target engine torque which is obtained from the target engine operation point and an electric power balance equation including the target electric power.

Advantageous Effects of Invention

According to the drive control apparatus of the hybrid vehicle of the invention, even in a transient state where the engine operation point is changed, fuel consumption can be improved by tracing a target operation point line. The target electric power is changed in consideration of the operation point of the internal combustion engine and the target drive force can be assured so as to satisfy a request of the driver.

BRIEF DESCRIPTION OF DRAWINGS

FIG. 8 is a diagram showing a target engine operation point in a transient state. (Embodiment)

FIG. 9 is a diagram showing a target drive force retrieval map. (Embodiment)

DESCRIPTION OF EMBODIMENTS

According to the invention, an object for satisfying both of a point that an internal combustion engine is protected by restricting an engine rotational speed and a point that a drive force which is required by the driver is satisfied by power assistance using an electric power of a battery is realized by tracing a target operation point line even in a transient state where an engine operation point is changed or by changing a target electric power.

Embodiments

FIGS. 1 to 19 show an embodiment of the invention.

Figure 1:
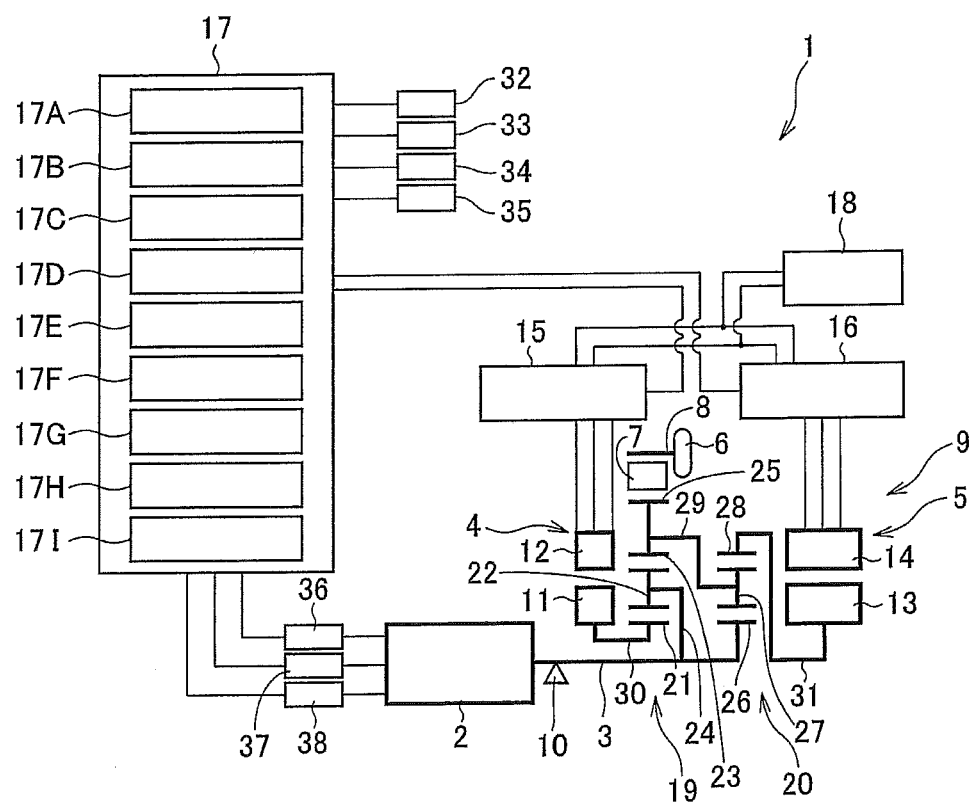
FIG. 1 is a system constructional diagram of a drive control apparatus of a hybrid vehicle. (Embodiment)

In FIG. 1, reference numeral 1 denotes a drive control apparatus of a hybrid vehicle as an electric vehicle.

The drive control apparatus 1 has: an output axis 3 of an internal combustion engine (referred to as "ENG" in the diagram) 2 serving as a drive source for outputting a torque; a first motor generator (referred to as "MG1" in the diagram) 4 and a second motor generator (referred to as "MG2" in the diagram) 5 serving as a plurality of motor generators (electric motors); a drive axis (referred to as "OUT" in the diagram) 8 connected to a drive wheel 6 through an output transfer mechanism 7; and a power transmission mechanism (differential gear mechanism) 9 coupled with the output axis 3 of the internal combustion engine 2, the first motor generator 4, the second motor generator 5, and the drive axis 8, respectively.

On the internal combustion engine 2 side, a one-way clutch 10 is provided on the way of the output axis 3 of the internal combustion engine 2. The one-way clutch 10 is provided to prevent the internal combustion engine 2 from rotating reversely. When the EV (electric vehicle) runs, the one-way clutch 10 receives a torque reaction of the second motor generator 5.

The first motor generator 4 is constructed by a first rotor 11 and a first stator 12. The second motor generator 5 is constructed by a second rotor 13 and a second stator 14.

The drive control apparatus 1 has: a first inverter 15 for operating and controlling the first motor generator 4; a second inverter 16 for operating and controlling the second motor generator 5; and control means (drive control unit: ECU) 17 coupled with the first inverter 15 and the second inverter 16.

The first inverter 15 is connected to the first stator 12 of the first motor generator 4. The second inverter 16 is connected to the second stator 14 of the second motor generator 5.

A power source terminal of each of the first inverter 15 and the second inverter 16 is connected to a battery (high-voltage battery for driving) 18. The battery 18 can supply and receive an electric power to/from the first motor generator 4 and the second motor generator 5.

The drive control apparatus 1 drives and controls the hybrid vehicle by using outputs from the internal combustion engine, the first motor generator 4, and the second motor generator 5.

The power transmission mechanism 9 is what is called a power input/output apparatus of a quadruple type and is constructed as follows. The output axis 3 of the internal combustion engine 2 and the drive axis 8 are arranged. The first motor generator 4 on the internal combustion engine 2 side and the second motor generator 5 on the drive axis 8 side are arranged. A motive power of the internal combustion engine 2, a motive power of the first motor generator 4, and a motive power of the second motor generator 5 are synthesized and output to the drive axis 8. The motive powers are transmitted and received between the internal combustion engine 2 and the first motor generator 4, second motor generator 5, and drive axis 8.

Figure 12:
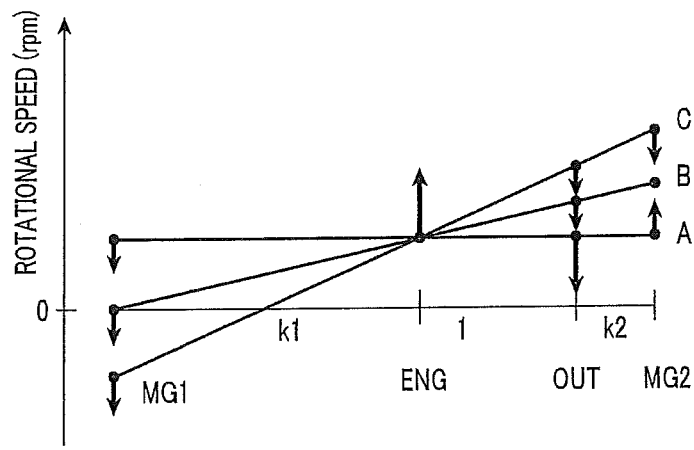
FIG. 12 is a collinear diagram showing a target drive force retrieval map. (Embodiment)

As shown in a collinear diagram of FIG. 12, four rotational elements of the power transmission mechanism 9 are arranged in order of the rotational element coupled with the first motor generator (MG1) 4, the rotational element coupled with the internal combustion engine (ENG) 2, the rotational element coupled with the drive axis (OUT) 8, and the rotational element coupled with the second motor generator (MG2) 5. Mutual lever ratios among those rotational elements are set to k1:1:k2 in the same order as that mentioned above.

k1: Lever ratio between the first motor generator (MG1) and the internal combustion engine (ENG) in the case where a distance between the internal combustion engine (ENG) and the drive axis (OUT) is set to "1"

k2: Lever ratio between the drive axis (OUT) and the second motor generator (MG2) 5 in the case where a distance between the internal combustion engine (ENG) and the drive axis (OUT) is set to "1"

The power transmission mechanism 9 is constructed in such a manner that a first planetary gear mechanism 19 and a second planetary gear mechanism 20 whose two rotational elements are coupled are arranged in parallel.

The first planetary gear mechanism 19 has: a first sun gear 21; a first pinion gear 22 engaged with the first sun gear 21; a first ring gear 23 engaged with the first pinion gear 22; a first carrier 24 coupled with the first pinion gear 22; and an output gear 25 coupled with the first ring gear 23.

The second planetary gear mechanism 20 has: a second sun gear 26; a second pinion gear 27 engaged with the second sun gear 26; a second ring gear 28 engaged with the second pinion gear 27; and a second carrier 29 coupled with the second pinion gear 27.

In the power transmission mechanism 9, the first carrier 24 of the first planetary gear mechanism 19 is coupled with the output axis 3 of the internal combustion engine 2, and the second carrier 29 of the second planetary gear mechanism 20 is coupled with the first ring gear 23 and the output gear 25 of the first planetary gear mechanism 19.

The first rotor 11 of the first motor generator 4 is connected to the first sun gear 21 through a first motor output axis 30. The output axis 3 of the internal combustion engine 2 is connected to the first carrier 24 and the second sun gear 26. The drive axis 8 is connected to the first ring gear 23 and the second carrier 29 through the output gear 25 and the output transfer mechanism 7. The second rotor 13 of the second motor generator 5 is connected to the second ring gear 28 through a second motor output axis 31.

The second motor generator 5 can be directly coupled with the drive wheel 6 through the second motor output axis 31, second ring gear 28, second carrier 29, first ring gear 23, output gear 25, output transfer mechanism 7, and drive axis 8 and has performance for enabling the vehicle to run only by a single output.

That is, in the power transmission mechanism 9, the first carrier 24 of the first planetary gear mechanism 19 and the second sun gear 26 of the second planetary gear mechanism 20 are coupled and connected to the output axis 3 of the internal combustion engine 2, and the first ring gear 23 of the first planetary gear mechanism 19 and the second carrier 29 of the second planetary gear mechanism 20 are coupled and connected to the drive axis 8, the first motor generator 4 is connected to the first sun gear 21 of the first planetary gear mechanism 19, the second motor generator 5 is connected to the second ring gear 28 of the second planetary gear mechanism 20, and the motive powers are transmitted and received between the internal combustion engine 2 and the first motor generator 4, second motor generator 5, and drive axis 8.

Accelerator opening degree detecting means 32 for detecting a depression amount of an accelerator pedal as an accelerator opening degree, vehicle speed detecting means 33 for detecting a vehicle speed, battery charge state detecting means 34 for detecting a state of charge (SOC) of the battery 18, and engine rotational speed detecting means 35 for detecting an engine rotational speed are connected to the control means 17.

An air amount adjusting mechanism 36, a fuel supplying mechanism 37, and an ignition timing adjusting mechanism 38 are connected to the control means 17 so as to control the internal combustion engine 2.

Figure 2:
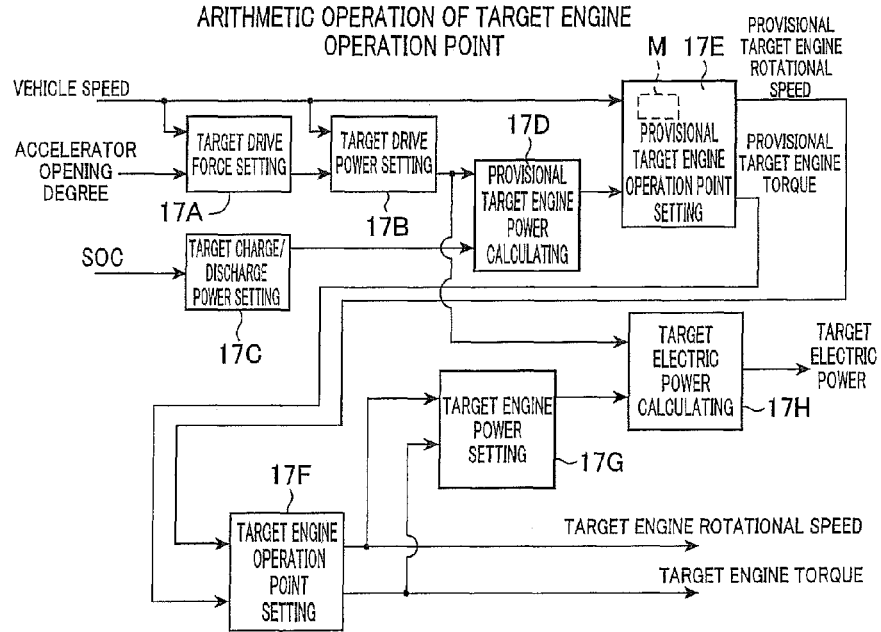
FIG. 2 is a control block diagram for calculating a target engine operation point and a target electric power. (Embodiment)

As shown in FIGS. 1 and 2, the control means 17 has target drive force setting means 17A, target drive power setting means 17B, target charge/discharge power setting means 17C, provisional target engine power calculating means 17D, provisional target engine operation point setting means 17E, target engine operation point setting means 17F, target engine power setting means 17G, target electric power calculating means 17H, and motor torque instruction value operating means 17I.

The target drive force setting means 17A sets a target drive force on the basis of the accelerator opening degree detected by the accelerator opening degree detecting means 32 and the vehicle speed detected by the vehicle speed detecting means 33.

The target drive power setting means 17B sets a target drive power on the basis of the accelerator opening degree detected by the accelerator opening degree detecting means 32 and the vehicle speed detected by the vehicle speed detecting means 33.

The target charge/discharge power setting means 17C sets a target charge/discharge power on the basis of at least a charge state (SOC) of the battery 18 detected by the battery charge state detecting means 34.

The provisional target engine power calculating means 17D calculates a provisional target engine power from the target drive power set by the target drive power setting means 17B and the target charge/discharge power set by the target charge/discharge power setting means 17C.

A target engine power maximum value (restriction value) corresponding to a state where the target drive power receives power assistance by the electric power of the battery 18 is preset and provided in the provisional target engine operation point setting means 17E. The provisional target engine operation point setting means 17E compares the provisional target engine power calculated from the target drive power setting means 17B and the target charge/discharge power setting means 17C with the target engine power maximum value and updates a smaller one of the values as a provisional target engine power. Thus, while controlling the engine operation point so as to be matched with the target value, the state of charge (SOC) of the battery 18 can be set into a predetermined range and a power assistance region using the electric power of the battery 18 can be provided. The driving using the electric power of the battery 18 can be also performed by using the power assistance region in accordance with a request of the driver. Further, the control of the first motor generator 4 and the second motor generator 5 in the case where there is a charge/discharge to/from the battery 18 can be performed.

The provisional target engine operation point setting means 17E sets a provisional target engine operation point for deciding a provisional target engine rotational speed and a provisional target engine torque from the provisional target engine power calculated by the provisional target engine power calculating means 17D and a retrieval map M of the whole system efficiency.

The target engine operation point setting means 17F presets the change rate restriction value of the target engine rotational speed which is set on the basis of the vehicle speed detected by the vehicle speed detecting means 33, calculates a target engine rotational speed restriction value from the change rate restriction value and the previous target engine rotational speed, and sets a target engine operation point for deciding the target engine rotational speed and the target engine torque on the basis of the target engine rotational speed restriction value and the provisional target engine rotational speed.

The target engine power setting means 17G calculates a target engine power from the target engine rotational speed calculated by the target engine operation point setting means 17F and the target engine torque calculated by the provisional target engine operation point setting means 17E.

The target electric power calculating means 17H calculates a target electric power from a difference between the target engine power which is calculated from the target engine operation point set by the target engine operation point setting means 17F and the target drive power set by the target drive power setting means 17B.

The motor torque instruction value operating means 17I sets a torque instruction value of each of the first motor generator 4 and the second motor generator 5 and calculates the torque instruction value of each of the first motor generator 4 and the second motor generator 5 by using a torque balance equation including the target engine torque which is obtained from the target engine operation point and an electric power balance equation including the target electric power.

The motor torque instruction value operating means 17I sets a feedback correction amount into the torque instruction value of each of the first motor generator 4 and the second motor generator 5 so as to converge the actual engine rotational speed to the target engine rotational speed which is obtained from the target engine operation point. Thus, the engine rotational speed can be rapidly converged to the target value by finely correcting the torque instruction value of each of the first motor generator 4 and the second motor generator 5. Since the engine operation point can be matched with the target operation point, the vehicle can be set into the proper running state.

Further, the motor torque instruction value operating means 17I calculates the rotational speed of each of the first motor generator 4 and the second motor generator 5 from the target engine rotational speed which is obtained from the target engine operation point and the vehicle speed, calculates the torque instruction value of the first motor generator 4 on the basis of the rotational speeds of the first motor generator 4 and the second motor generator 5, the target electric power, and the target engine torque, and calculates the torque instruction value of the second motor generator 5 on the basis of the torque instruction value of the first motor generator 4 and the target engine torque. Since the torque instruction values of the first motor generator 4 and the second motor generator 5 are individually calculated, the feedback correction can be also individually performed.

That is, in the embodiment, in the hybrid vehicle for synthesizing the output of the internal combustion engine 2 and the motive powers of the first motor generator 4 and the second motor generator 5 and driving the drive axis 8 connected to the drive wheel 6: the value of the drive force obtained by adding the force of the power assistance by the electric power is preset as a maximum value of the target drive force; the target drive power is obtained from the target drive force in which the accelerator opening degree and the vehicle speed are used as parameters and from the vehicle speed; the target charge/discharge power is obtained on the basis of the charge state (SOC) and added to the target drive power and a resultant value is obtained as a provisional target engine power; the provisional target engine operation point is obtained from the provisional target engine power, is changed to a value corresponding to the engine rotational speed at the provisional target engine operation point, and is set to the target engine operation point; the target engine power is calculated from the target engine operation point; the target electric power as a target value of the input/output electric power to/from the battery 18 is obtained from the difference between the target drive power and the target electric power; and the control instruction value (torque instruction value) of each of the first motor generator 4 and the second motor generator 5 is arithmetically operated from the torque balance equation including the target engine torque and the electric power balance equation including the target electric power.

A change in engine operation point in the embodiment is as shown in FIG. 8. In the case of changing the engine operation point from A point to D point, as shown in FIG. 8, the engine operation point is changed while tracing A point→B point→C point→D point. Therefore, a sudden change of the engine rotational speed can be suppressed by a change rate restriction of the target engine rotational speed, that is, by a change amount restriction per unit time.

Subsequently, the arithmetic operations for obtaining the target engine operation point (target engine rotational speed, target engine torque) and the target electric power from the accelerator opening degree and the vehicle speed will be described on the basis of a control block diagram of FIG. 2 and flowcharts of FIGS. 4 and 5.

Figure 4:
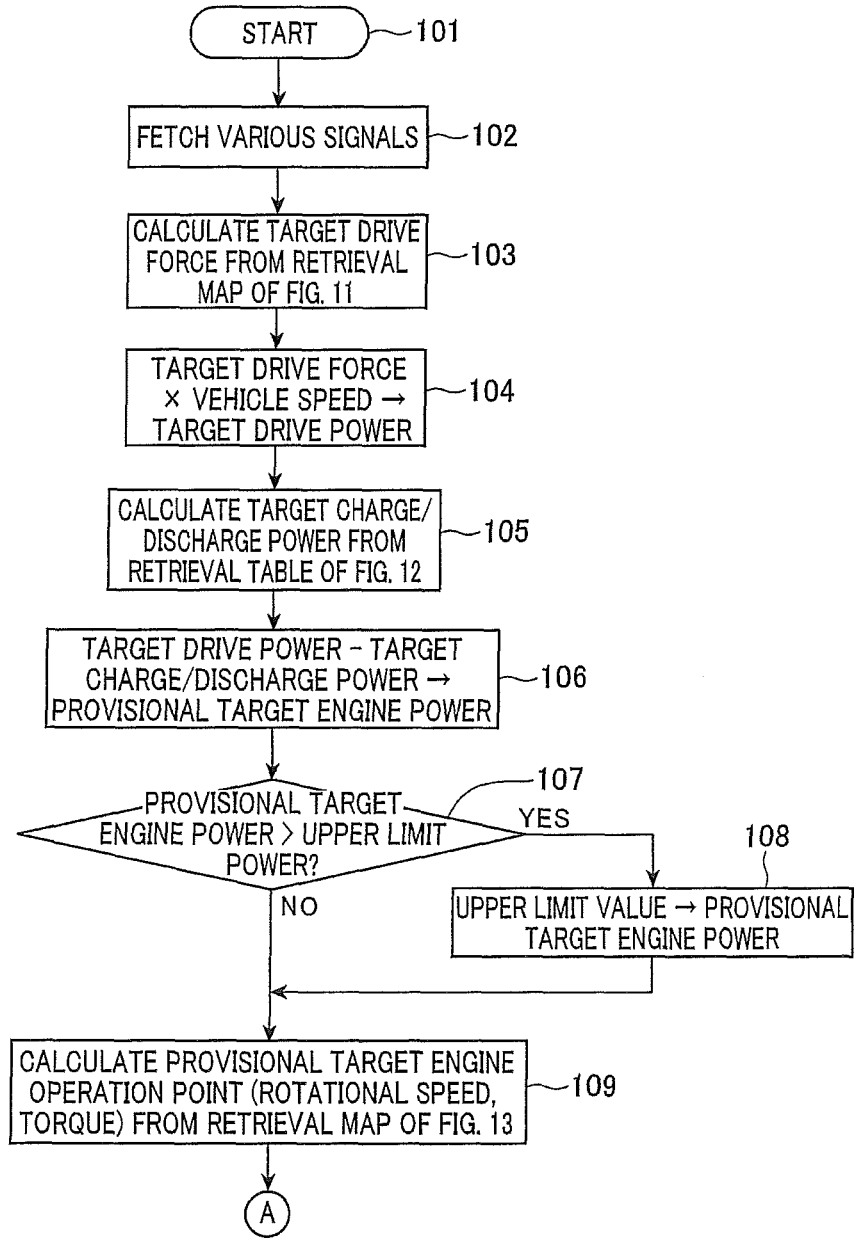
FIG. 4 is a flowchart for calculating a target engine operation point and a target electric power. (Embodiment)

As shown in FIG. 4, when a program of the control means 17 is started (step 101), first, various kinds of signals (accelerator opening degree, vehicle speed, charge state (SOC)) which are used for control are fetched (step 102). A target drive force according to the accelerator opening degree and the vehicle speed is calculated from a target drive force retrieval map shown in FIG. 9 (step 103). In this case, a high vehicle speed region where the accelerator opening degree is equal to zero (0) is set to a negative value so as to obtain a drive power in the decelerating direction corresponding to an engine brake. On the other hand, in a region where the vehicle speed is low, it is set to a positive value so that a creep run can be performed.

By multiplying the target drive force and the vehicle speed, a target drive power necessary to drive the vehicle by the target drive force is set (step 104).

Figure 10:
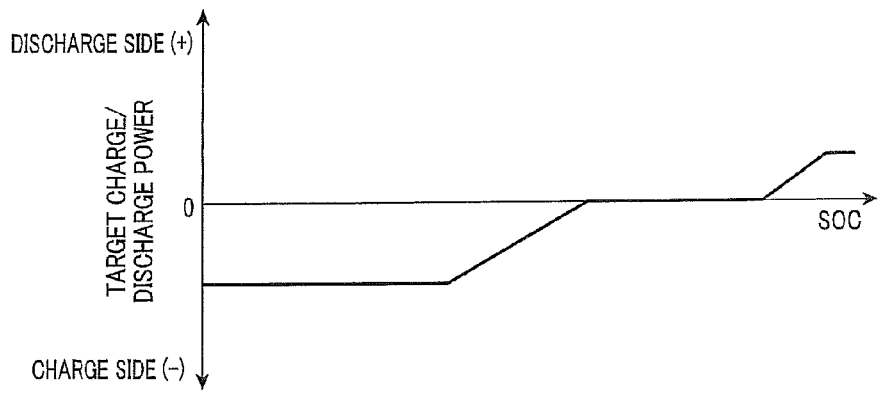
FIG. 10 is a diagram showing a target charge/discharge power retrieval table. (Embodiment)

Further, in order to control the charge state (SOC) of the battery 18 so as to lie within a normal use range, the target charge/discharge power is calculated from a target charge/discharge amount retrieval table shown in FIG. 10 (step 105). In this case, when the charge state (SOC) of the battery 18 is low, by increasing the charge power, an overdischarge of the battery 18 is prevented. When the charge state (SOC) of the battery 18 is high, by increasing the discharge power, an overcharge is prevented. For convenience of explanation, the discharge side is handled as a positive value and the charge side is handled as a negative value.

The provisional target engine power to be output by the internal combustion engine 2 is calculated from the target drive power and the target charge/discharge power (step 106). The provisional target engine power to be output by the internal combustion engine 2 is set to a value obtained by adding a power adapted to charge the battery 18 to the power necessary to drive the hybrid vehicle (in the case of the discharge, by subtracting). In this case, since the charge side is handled as a negative value, the provisional target engine power is calculated by subtracting the target charge/discharge power from the target drive power.

Whether or not the provisional target engine power has exceeded an upper limit power is discriminated (step 107).

If step 107 is YES, the upper limit power is set to the provisional target engine power so as to perform an upper limit guard of the provisional target engine power (step 108).

Figure 11:
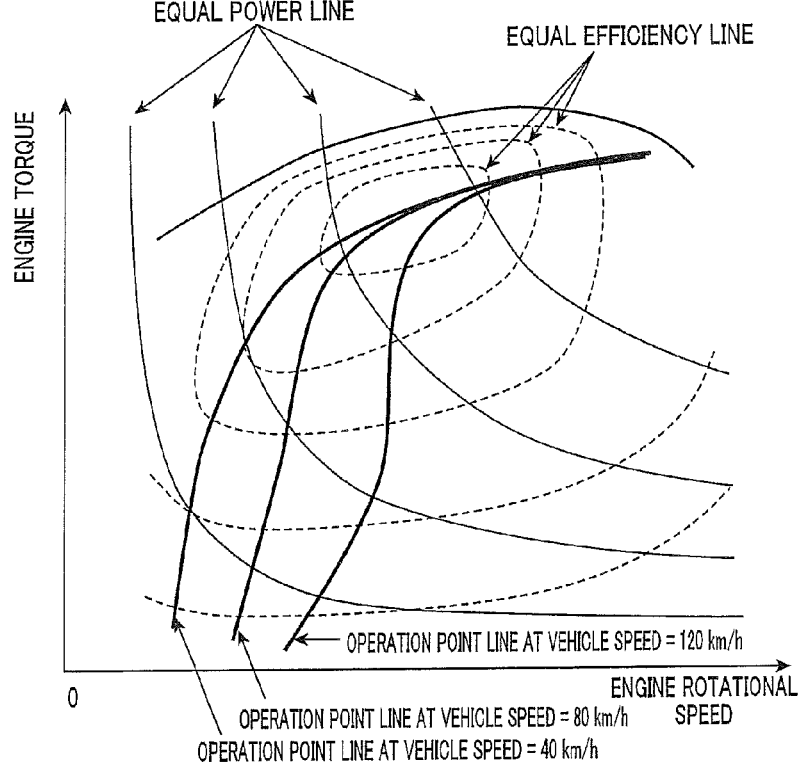
FIG. 11 is a diagram showing a target operation point retrieval map. (Embodiment)

If step 107 is NO or after the process of step 108, the provisional target engine operation point (target engine rotational speed, target engine torque) according to the provisional target engine power and the vehicle speed is calculated from a target operation point retrieval map shown in FIG. 11 (step 109).

In the above target engine operation point retrieval map, as shown in FIG. 11, a point where the whole efficiency obtained by adding an efficiency of a power transmission system constructed by the power transmission mechanism 9, first motor generator 4, and second motor generator 5 to an efficiency of the internal combustion engine 2 is improved is selected every power on an equal power line, and a line obtained by connecting the selected points is set as a target operation point line. The target operation point line is set every vehicle speed. Such a set value may be experimentally obtained or may be obtained by calculating from the efficiencies of the internal combustion engine 2, first motor generator 4, and second motor generator 5.

The target operation point line is set so as to be shifted to a high rotational speed side as the vehicle speed rises. This is because of the following reasons.

In the case where the same engine operation point is set to the target engine operation point irrespective of the vehicle speed, as shown in FIG. 12, when the vehicle speed is low, the rotational speed of the first motor generator 4 is positive, the first motor generator 4 becomes a generator, and the second motor generator 5 becomes an electric motor (state of A in FIG. 12). As the vehicle speed rises, the rotational speed of the first motor generator 4 approaches zero (0) (state of B in FIG. 12). When the vehicle speed further rises, the rotational speed of the first motor generator 4 becomes negative. In this state, the first motor generator 4 operates as an electric motor and the second motor generator 5 operates as a generator (state of C in FIG. 12).

When the vehicle speed is low (state of A and state of B in FIG. 12), since a circulation of the power does not occur, the target operation point is close to a point where the engine efficiency is mainly high like a target operation point line of the vehicle speed=40 km/h shown in FIG. 11.

However, when the vehicle speed is high (state of C in FIG. 12), the first motor generator 4 operates as an electric motor, the second motor generator 5 operates as a generator, and the power circulation occurs, so that the efficiency of the power transmission system deteriorates.

Figure 13:
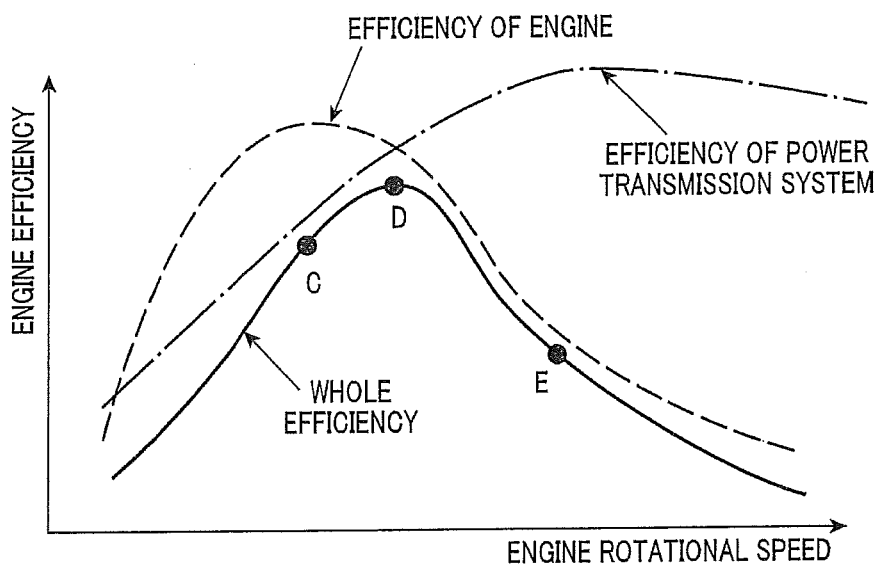
FIG. 13 is a diagram showing each efficiency state on an equal power line. (Embodiment)

Therefore, as shown at a point C in FIG. 13, even if the engine efficiency is high, since the efficiency of the power transmission system deteriorates, the whole efficiency deteriorates.

Figure 14:
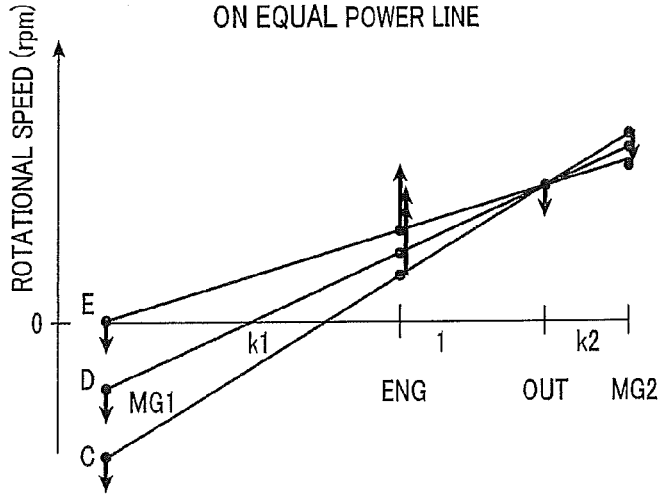
FIG. 14 is a collinear diagram showing each point (D, E, F) on an equal power line. (Embodiment)

Therefore, in order to prevent the power circulation from occurring in the high vehicle speed region, as shown at a point E of a collinear diagram shown in FIG. 14, it is desirable to set the rotational speed of the first motor generator 4 to zero (0) or higher. However, if doing so, since the engine operation point is shifted to such a direction that the engine rotational speed rises, as shown at a point E in FIG. 13, even if the efficiency of the power transmission system is raised, the engine efficiency deteriorates largely. Thus, the whole efficiency deteriorates.

Therefore, as shown in FIG. 13, a point where the whole engine efficiency is high is a point D between both of them. If such a point D is set to the target engine operation point, the most efficient driving can be performed.

Figure 15:
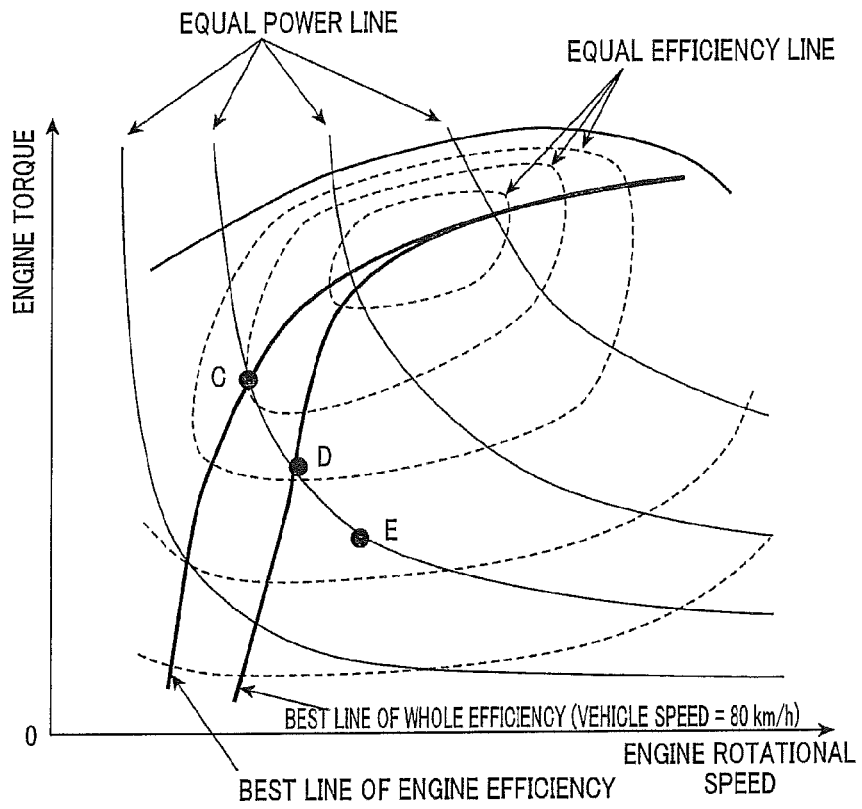
FIG. 15 is a diagram showing a best line of an engine efficiency and a best line of a whole efficiency. (Embodiment)

The three operation points of C, D, and E mentioned above are plotted on a target operation point retrieval map as shown in FIG. 15. In FIG. 15, naturally, the engine operation point where the whole efficiency is best when the vehicle speed is high is shifted to the higher rotational speed side than that at the operation point where the engine efficiency is best.

Subsequently, the arithmetic operations of the target engine operation point and the target electric power will be described with reference to a flowchart of FIG. 5.

Figure 5:
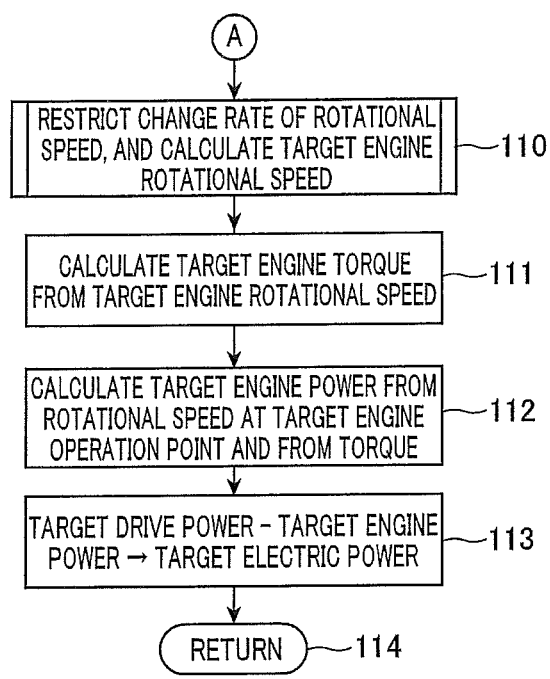
FIG. 5 is a flowchart for calculating a target engine operation point and a target electric power in sequel to FIG. 4. (Embodiment)

As shown in FIG. 5, after the process of step 109 in FIG. 4, the change rate of the provisional target engine rotational speed and the target engine rotational speed is calculated (step 110).

Figure 6:
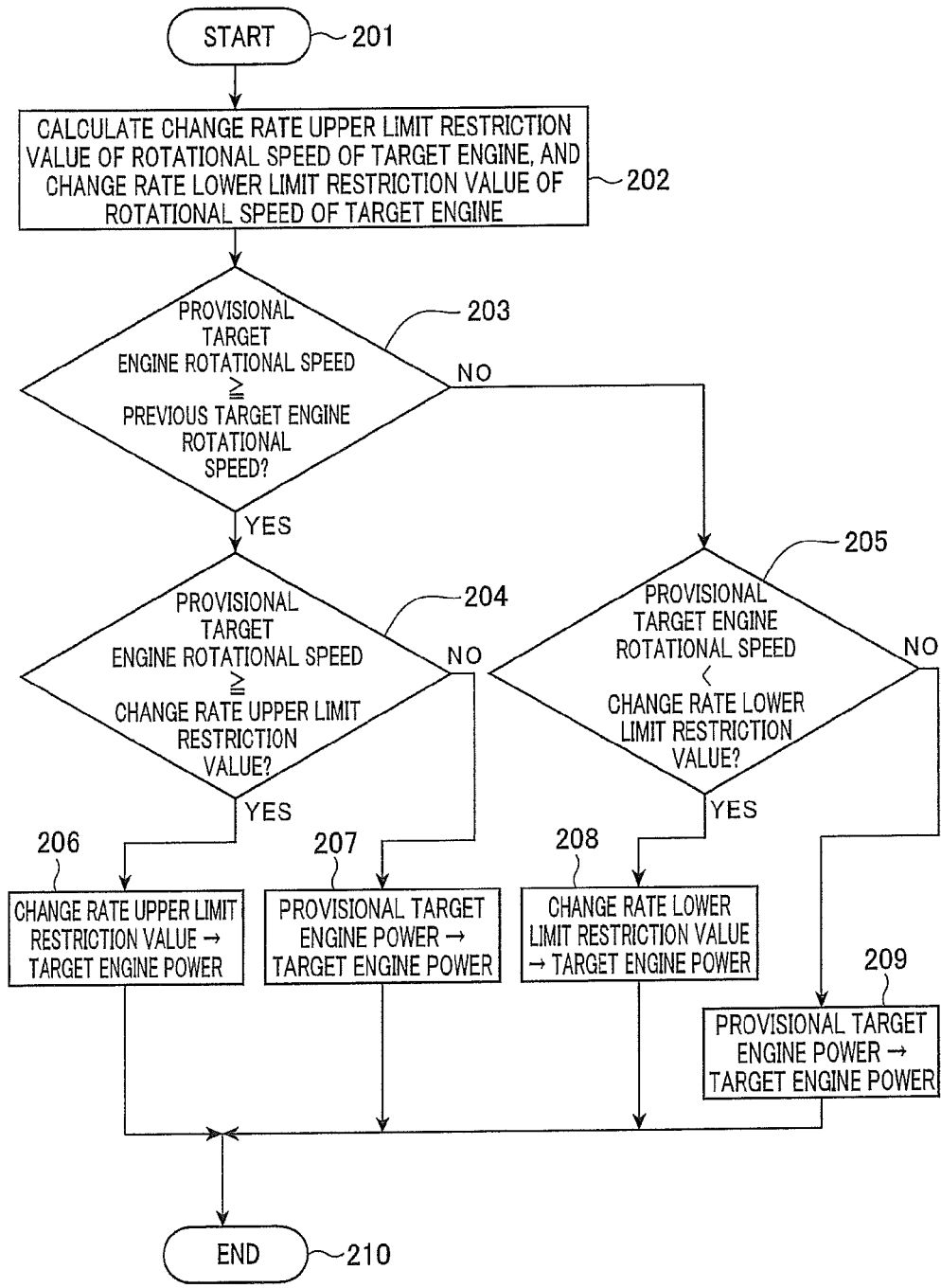
FIG. 6 is a flowchart for calculating a target engine rotational speed in FIG. 4. (Embodiment)

Specifically speaking, a subflow of FIG. 6 is used in the calculation of the target engine rotational speed.

As shown in FIG. 6, when the program is started (step 201), a change rate upper limit restriction value of the target engine rotational speed and a change rate lower limit restriction value of the target engine rotational speed in the case where the rotational speed was changed from the previous (current) target engine rotational speed by an amount corresponding to a predetermined change rate are calculated (step 202). Whether or not the provisional target engine rotational speed is equal to or higher than the previous (current) target engine rotational speed is discriminated (step 203).

If step 203 is YES, whether or not the provisional target engine rotational speed is equal to or higher than the change rate upper limit restriction value of the target engine rotational speed is discriminated (step 204).

If step 203 is NO, whether or not the provisional target engine rotational speed is less than the change rate upper limit restriction value of the target engine rotational speed is discriminated (step 205).

If step 204 is YES, the change rate upper limit restriction value of the target engine rotational speed is set to the target engine rotational speed (step 206).

If step 204 is NO, the provisional target engine rotational speed is set to the target engine rotational speed (step 207).

If step 205 is YES, the change rate lower limit restriction value of the target engine rotational speed is set to the target engine rotational speed (step 208).

If step 205 is NO, the provisional target engine rotational speed is set to the target engine rotational speed (step 209).

After the process of step 206, step 207, step 208, or step 209, the program is finished (step 210).

Returning to the flowchart of FIG. 5, the target engine torque at the target engine rotational speed is calculated from the target engine operation point retrieval map in a transient state in FIG. 8 (step 111).

The target engine operation point in the embodiment is as shown in FIG. 8. In the case of changing the engine operation point from point A to point D, the engine operation point is changed by the change rate restriction of the target engine rotational speed while sequentially tracing point A, point B, point C, and point D. At point B or point C during the change of the engine operation point, the power which is output from the engine 2 is smaller than that at point D serving as a final target value.

Subsequently, the target engine power is calculated from the calculated target engine operation point (target engine rotational speed, target engine torque) (step 112).

The target engine power is subtracted from the target drive power and the target electric power is calculated (step 113). When the target drive power is larger than the target engine power, the target electric power is set to a value which denotes an assistance power by the battery electric power. When the target engine power is larger than the target drive power, the target electric power is set to a value which denotes a charge electric power to the battery.

Since the target engine power is equal to a value which can be actually output, if the power assistance is performed by the target electric power which was calculated here, the drive force which is required by the driver can be obtained.

The program is returned (step 114).

Figure 3:
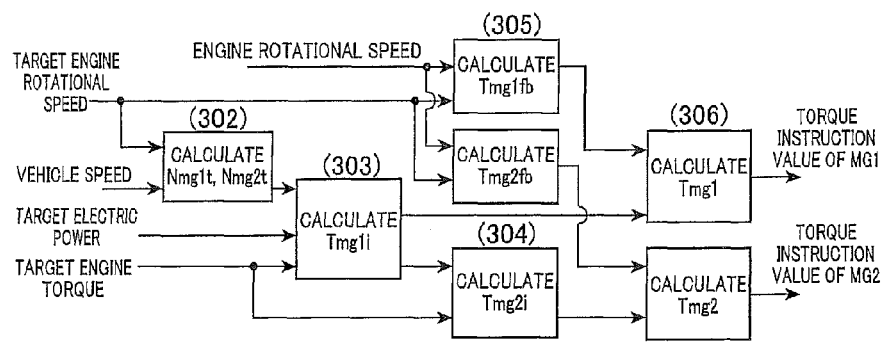
FIG. 3 is a control block diagram for calculating a torque instruction value. (Embodiment)

Subsequently, arithmetic operations of the target torques of the first motor generator 4 and the second motor generator 5 for setting a charge/discharge amount of the battery to a target value while outputting the target drive force will be described on the basis of a control block diagram of FIG. 3 and a flowchart of FIG. 7.

Figure 7:
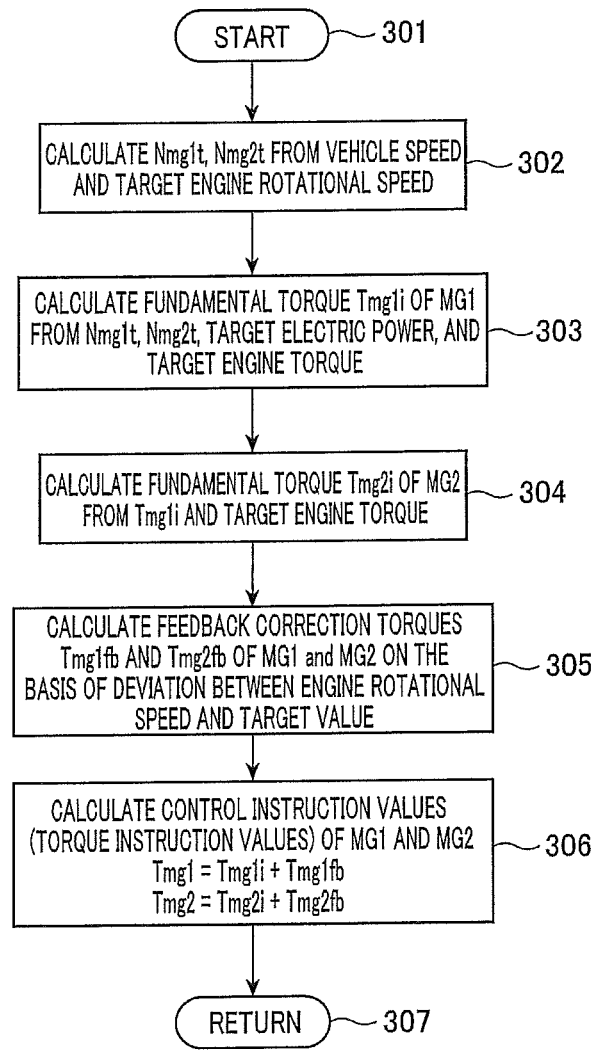
FIG. 7 is a flowchart for calculating a torque instruction value. (Embodiment)

As shown in FIG. 7, when the program of the control means 17 is started (step 301), first, rotational speeds No of the first planetary gear mechanism 19 and the second planetary gear mechanism 20 are calculated from the vehicle speed and a rotational speed Nmg1t of the first motor generator 4 and a rotational speed Nmg2t of the second motor generator 5 in the case where the engine rotational speed has reached a target engine rotational speed Net are calculated (step 302). The rotational speed Nmg1t and the rotational speed Nmg2t are calculated by the following (equation 1) and (equation 2). These arithmetic operation equations are obtained from a relation between the rotational speeds of the first planetary gear mechanism 19 and the second planetary gear mechanism 20.

$$Nmg1t = (Net - No) * k1 + Net \quad \text{(equation 1)}$$

$$Nmg2t = (No - Net) * k2 + No \quad \text{(equation 2)}$$

In the above (equation 1) and (equation 2) as shown in FIG. 12, k1: Lever ratio between the first motor generator (MG1) and the engine (ENG) in the case where a distance between the engine (ENG) and the drive axis (OUT) is set to "1"

k2: Lever ratio between the drive axis (OUT) and the second motor generator (MG2) in the case where a distance between the engine (ENG) and the drive axis (OUT) is set to "1"

That is, k1 and k2 are values which are decided by a gear ratio of the first planetary gear mechanism 19 and the second planetary gear mechanism 20.

A fundamental torque Tmg1i of the first motor generator 4 is calculated from the rotational speed Nmg1t, the rotational speed Nmg2t, a target electric power Pbatt, and a target engine torque Tet (step 303). The fundamental torque Tmg1i is calculated by the following calculation equation (3).

$$Tmg1i=(Pbatt*60/2\pi-Nmg2t*Tet/k2)/(Nmg1t+Nmg2t*(1+k1)/k2) \quad \text{(equation 3)}$$

This equation (3) can be obtained by solving simultaneous equations of the following equation (shown by the following "equation (4)") showing a balance of the torques which are input to the first planetary gear mechanism 19 and the second planetary gear mechanism 20 and the following equation (shown by the following "equation (5)") showing that the electric power which is generated or consumed by the first motor generator 4 and the second motor generator 5 and an input/output electric power (Pbatt) to/from the battery 18 are equal.

$$Tet+(1+k1)*Tmg1=k2*Tmg2 \quad \text{(equation 4)}$$

That is, in the torque balance equation, as shown by the above (equation 4), the target torques and the target engine torques of the first motor generator 4 and the second motor generator 5 are balanced on the basis of a lever ratio based on a gear ratio of the power transmission mechanism 9 for mechanically and operationally coupling the first motor generator 4, second motor generator 5, and internal combustion engine 2.

$$Nmg1*Tmg1*2\pi/60+Nmg2*Tmg2*2\pi/60=Pbatt \quad \text{(equation 5)}$$

Subsequently, a fundamental torque Tmg2i of the second motor generator 5 is calculated from the fundamental torque Tmg1i and the target engine torque by the following (equation 6) (step 304).

$$Tmg2i=(Tet+(1+k1)*Tmg1i)/k2 \quad \text{(equation 6)}$$

This (equation 6) is derived from the above equation (4).

Subsequently, in order to allow the engine rotational speed to approach the target, a deviation between the engine rotational speed and the target value is multiplied by a preset predetermined feedback gain, thereby calculating a feedback correction torque Tmg1fb of the first motor generator 4 and a feedback correction torque Tmg2fb of the second motor generator 5 (step 305).

The feedback correction torque Tmg1fb of the first motor generator 4 is calculated by $$Tmg1fb=-\Delta Te/(1+k1)$$

where, $\Delta Te$ denotes a change amount to the target torque of the engine torque based on the torque balance equation.

The feedback correction torque Tmg2fb of the second motor generator 5 is calculated by $$Tmg2fb=(k1/(1+k2))*Tmg1fb$$

The feedback correction amounts which are respectively set into the torque instruction values of the first motor generator 4 and the second motor generator 5 are set in association with each other on the basis of a gear ratio or lever ratio of the power transmission mechanism 9 having four rotational elements respectively coupled with the first motor generator 4, second motor generator 5, drive axis 8, and internal combustion engine 2.

The feedback correction torques Tmg1fb and Tmg2fb are added to the fundamental torques Tmg1i and Tmg2i, thereby calculating a torque instruction value Tmg1 of the first motor generator 4 and a torque instruction value Tmg2 of the second motor generator 5 (step 306).

The torque instruction value Tmg1 of the first motor generator 4 is calculated by $$Tmg1=Tmg1i+Tmg1fb$$

The torque instruction value Tmg2 of the second motor generator 5 is calculated by $$Tmg2=Tmg2i+Tmg2fb$$

By driving and controlling the first motor generator 4 and the second motor generator 5 by the calculated torque instruction values Tmg1 and Tmg2, the charge/discharge to/from the battery 18 can be set to a target value while outputting the target drive force.

After that, the program is returned (step 307).

Collinear diagrams in typical operation states are shown in FIGS. 16 to 19.

where, k1 and k2 are defined as follows.

$$k1=ZR1/ZS1$$

$$k2=ZS2/ZR2$$

where,
ZS1: The number of teeth of the first sun gear
ZR1: The number of teeth of the first ring gear
ZS2: The number of teeth of the second sun gear
ZR2: The number of teeth of the second ring gear Each operation state will be described by using the collinear diagrams of FIGS. 16 to 19.

In the collinear diagrams of FIGS. 16 to 19, the rotational speed is defined in such a manner that the rotating direction of the internal combustion engine 2 is set to the positive direction and the torque which is input/output to/from each axis is defined in such a manner that the direction in which the torque in the same direction as that of the torque of the internal combustion engine 2 is input is positive. Therefore, a case where the torque of the drive axis is positive corresponds to a state where the torque adapted to drive the vehicle rearwardly is output (deceleration at the time of forward movement; driving at the time of backward movement). On the other hand, a case where the torque of the drive axis is negative corresponds to a state where the torque adapted to drive the vehicle forwardly is output (driving at the time of forward movement; deceleration at the time of backward movement).

In the case of performing the power generation or power running (by applying the motive power to the front wheels (drive wheels), the acceleration is performed; or a balancing speed is held in an up-grade) by the first motor generator 4 and the second motor generator 5, a loss is caused by a heat generation in the first inverter 15 and the second inverter 16 or in the first motor generator 4 and the second motor generator 5. Therefore, an efficiency in the case of performing a conversion between an electric energy and a mechanical energy is not equal to 100%. However, for simplicity of description, an explanation will be made on the assumption that there is no loss.

In the case of actually considering the loss, it is sufficient to control so as to additionally power-generate by an amount of energy which is lost by the loss.

Figure 16:
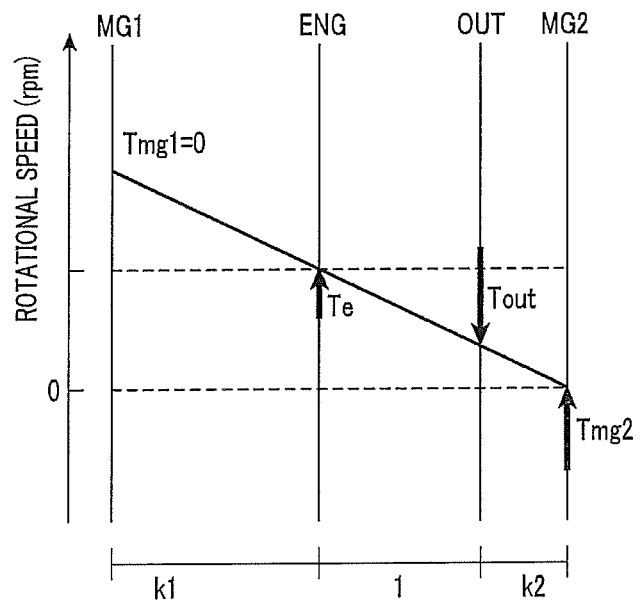
FIG. 16 is a collinear diagram of a LOW gear ratio state. (Embodiment)

(1) LOW Gear Ratio State (Refer to FIG. 16)

A state where the vehicle runs by the internal combustion engine 2 and the rotational speed of the second motor generator 5 is equal to zero (0). A collinear diagram at this time is shown in FIG. 16. Since the rotational speed of the second motor generator 5 is equal to zero (0), no electric power is consumed. Therefore, when there is no charge/discharge to/from the battery 18, since there is no need to perform the power generation in the first motor generator 4, the torque instruction value Tmg1 of the first motor generator 4 is equal to zero (0). A ratio between the engine rotational speed and the rotational speed of the drive axis is equal to $(1+k2)/k2$.

Figure 17:
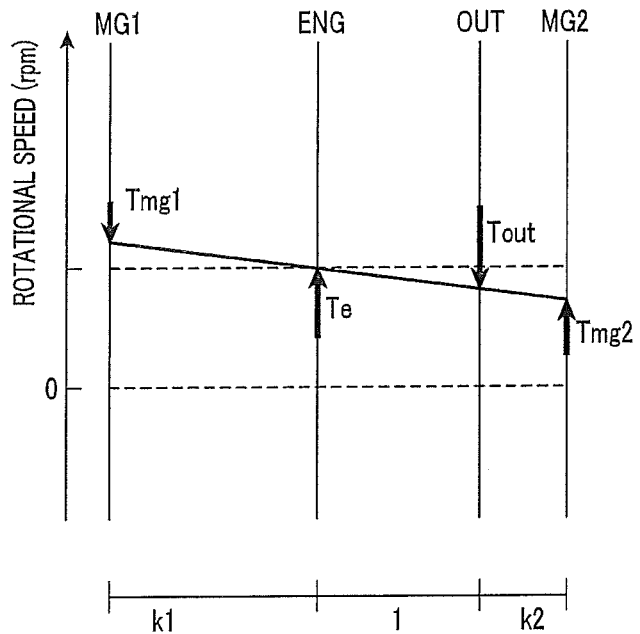
FIG. 17 is a collinear diagram of an intermediate gear ratio state. (Embodiment)

(2) Intermediate Gear Ratio State (Refer to FIG. 17)

A state where the vehicle runs by the internal combustion engine 2 and the rotational speeds of the first motor generator 4 and the second motor generator 5 are positive. A collinear diagram at this time is shown in FIG. 17. When there is no charge/discharge to/from the battery 18, the first motor generator 4 performs a regeneration and the second motor generator 5 is allowed to perform the power running by using this regenerated electric power.

Figure 18:
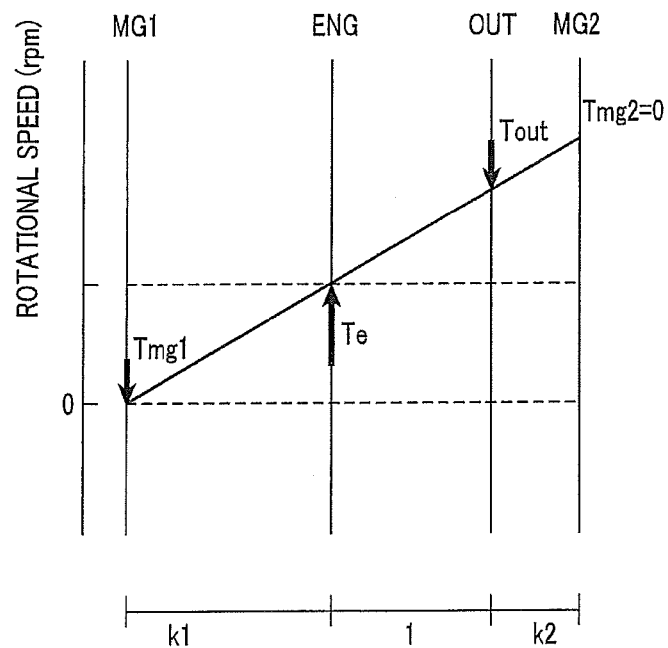
FIG. 18 is a collinear diagram of a HIGH gear ratio state. (Embodiment)

(3) HIGH Gear Ratio State (Refer to FIG. 18)

A state where the vehicle runs by the internal combustion engine 2 and the rotational speed of the first motor generator 4 is equal to zero (0). A collinear diagram at this time is shown in FIG. 18. Since the rotational speed of the first motor generator 4 is equal to zero (0), the regeneration is not performed. Therefore, when there is no charge/discharge to/from the battery 18, the power running or regeneration is not performed in the second motor generator 5 and the torque instruction value Tmg2 of the second motor generator 5 is equal to zero (0). A ratio between the engine rotational speed and the rotational speed of the drive axis is equal to $k1/(1+k1)$.

Figure 19:
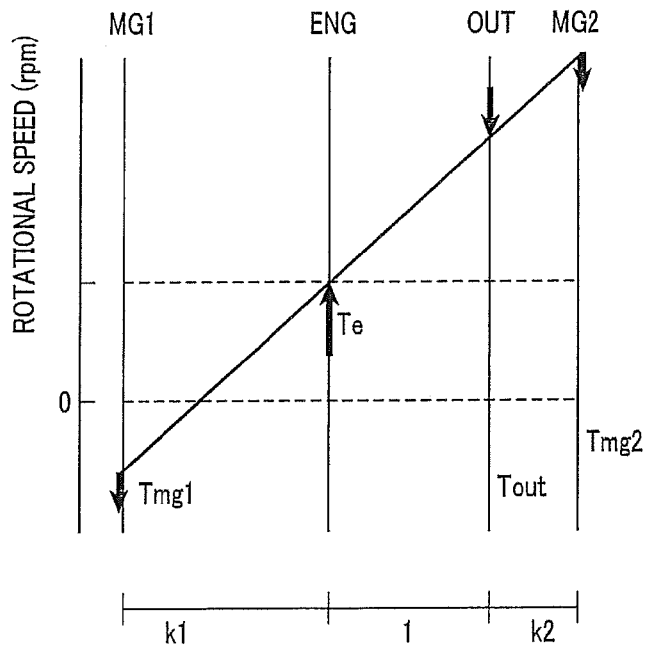
FIG. 19 is a collinear diagram of a state where a motive power circulation has occurred. (Embodiment)

(4) State where a Motive Power Circulation has Occurred (Refer to FIG. 19)

In the state where the vehicle speed is further higher than that in the HIGH gear ratio state in FIG. 18, the vehicle enters a state where the first motor generator 4 rotates reversely. In this state, the first motor generator 4 performs the power running and an electric power is consumed. Therefore, when there is no charge/discharge to/from the battery 18, the second motor generator 5 performs a regeneration and performs a power generation.

Thus, in the invention according to claim 1, the control means 17 has: the provisional target engine power calculating means 17D for calculating the provisional target engine power from the target drive power set by the target drive power setting means 17B and the target charge/discharge power set by the target charge/discharge power setting means 17C; the provisional target engine operation point setting means 17E for setting the provisional target engine operation point to decide the provisional target engine rotational speed and the provisional target engine torque from the provisional target engine power and the retrieval map M of the whole system efficiency; the target engine operation point setting means 17F for presetting the change rate restriction value of the target engine rotational speed which is set on the basis of the vehicle speed, calculating the restriction value of the target engine rotational speed from the change rate restriction value and the previous target engine rotational speed, and setting the target engine operation point to decide the target engine rotational speed and the target engine torque on the basis of the restriction value of the target engine rotational speed and the provisional target engine rotational speed; and the target electric power calculating means 17H for calculating the target electric power from the difference between the target engine power which is calculated from the target engine operation point set by the target engine operation point setting means 17F and the target drive power set by the target drive power setting means 17B.

The motor torque instruction value operating means 17I calculates the torque instruction value of each of the first motor generator 4 and the second motor generator 5 by using the torque balance equation including the target engine torque which is obtained from the target engine operation point and the electric power balance equation including the target electric power.

Thus, even in the transient state where the operation point of the internal combustion engine 2 is changed, since the target operation point line is traced, the fuel consumption can be improved.

The target electric power is changed in consideration of the operation point of the internal combustion engine 2 (engine operation point) and the target drive force can be assured so as to satisfy the request of the driver.

Further, after the target engine rotational speed was reset so as not to exceed the restriction value of the target engine rotational speed which is set on the basis of the change rate restriction value, the target electric power different from the target charge/discharge power is set on the basis of it. After that, the drive forces of the first motor generator 4 and the second motor generator 5 are set on the basis of the target engine operation point and the target electric power. Therefore, the engine rotational speed is restricted, the internal combustion engine 2 is maintained in a state of the high efficiency, the fuel consumption performance is assured, and the drive force which is required by the driver can be satisfied by the power assistance using the electric power of the battery 18.

INDUSTRIAL APPLICABILITY

The drive control apparatus according to the invention can be applied not only to the hybrid vehicle but also to another electric vehicle such as an electric car or the like.

REFERENCE SIGNS LIST

1 Drive control apparatus of hybrid vehicle
2 Internal combustion engine (ENG)
4 First motor generator (MG1)
5 Second motor generator (MG2)
6 Drive wheel
8 Drive axis (OUT)
9 Power transmission mechanism
15 First inverter
16 Second inverter
17 Control means
17A Target drive force setting means
17B Target drive power setting means
17C Target charge/discharge power setting means
17D Provisional target engine power calculating means
17E Provisional target engine operation point setting means
17F Target engine operation point setting means
17G Target engine power setting means
17H Target electric power calculating means
17I Motor torque instruction value operating means
18 Battery
32 Accelerator opening degree detecting means
33 Vehicle speed detecting means
34 Battery charge state detecting means
35 Engine rotational speed detecting means

The invention claimed is:

1. A drive control apparatus of a hybrid vehicle for driving and controlling a vehicle by using outputs from an internal combustion engine and a plurality of motor generators, comprising:

accelerator opening degree detecting means for detecting an accelerator opening degree;

vehicle speed detecting means for detecting a vehicle speed;

battery charge state detecting means for detecting a charge state of a battery; and control means having target drive power setting means for setting a target drive power on the basis of the accelerator opening degree detected by the accelerator opening degree detecting means and the vehicle speed detected by the vehicle speed detecting means, target charge/discharge power setting means for setting a target charge/discharge power on the basis of at least the charge state of the battery detected by the battery charge state detecting means, and motor torque instruction value operating means for setting a torque instruction value of each of the plurality of motor generators, wherein the control means has provisional target engine power calculating means for calculating a provisional target engine power from the target drive power set by the target drive power setting means and the target charge/discharge power set by the target charge/discharge power setting means, provisional target engine operation point setting means for setting a provisional target engine operation point to decide a provisional target engine rotational speed and a provisional target engine torque from the provisional target engine power calculated by the provisional target engine power calculating means and a retrieval map of a whole system efficiency, target engine operation point setting means for presetting a change rate restriction value of the target engine rotational speed which is set on the basis of the vehicle speed detected by the vehicle speed detecting means, calculating a restriction value of the target engine rotational speed from the change rate restriction value and a previous target engine rotational speed, and setting a target engine operation point to decide the target engine rotational speed and a target engine torque on the basis of the restriction value of the target engine rotational speed and the provisional target engine rotational speed, and target electric power calculating means for calculating a target electric power from a difference between the target engine power which is calculated from the target engine operation point set by the target engine operation point setting means and the target drive power set by the target drive power setting means, and wherein the motor torque instruction value operating means calculates the torque instruction value of each of the plurality of motor generators by using a torque balance equation including the target engine torque which is obtained from the target engine operation point and an electric power balance equation including the target electric power.

* * * * *